(12) United States Patent
Christiansen et al.

(10) Patent No.: US 7,279,020 B2
(45) Date of Patent: Oct. 9, 2007

(54) AXIAL DEMISTING CYCLONE

(75) Inventors: Bjorn Christiansen, Trondheim (NO);
Knut Sveberg, Trondheim (NO); Inge Hjelkrem, Trondheim (NO); Dag Kvamsdal, Trondheim (NO)

(73) Assignee: ConSept A/S, Trondheim (NO)

( * ) Notice: Subject to any disclaimer, the term of this patent is extended or adjusted under 35 U.S.C. 154(b) by 408 days.

(21) Appl. No.: 10/493,226

(22) PCT Filed: Nov. 7, 2002

(86) PCT No.: PCT/NO02/00408

§ 371 (c)(1),
(2), (4) Date: Aug. 26, 2004

(87) PCT Pub. No.: WO03/039755

PCT Pub. Date: May 15, 2003

(65) Prior Publication Data

US 2005/0000200 A1    Jan. 6, 2005

(30) Foreign Application Priority Data

Nov. 7, 2001    (NO) .................................. 20015436

(51) Int. Cl.
*B01D 45/12* (2006.01)
(52) U.S. Cl. .............................. 55/338; 55/457; 55/466
(58) Field of Classification Search .................. 55/338, 55/345, 347, 348, 457, 459.1, 466
See application file for complete search history.

(56) References Cited

U.S. PATENT DOCUMENTS

| 3,405,575 | A |   | 10/1968 | Krizman |
| 4,629,481 | A | * | 12/1986 | Echols ........................ 55/348 |
| 5,466,272 | A |   | 11/1995 | Karlsson et al. |
| 6,176,900 | B1 | * | 1/2001 | Swanborn .................... 95/269 |

FOREIGN PATENT DOCUMENTS

WO        00 25931       5/2000

\* cited by examiner

*Primary Examiner*—Robert A. Hopkins
(74) *Attorney, Agent, or Firm*—Dennison, Schultz & MacDonald

(57) ABSTRACT

Axial flow demisting cyclone for separation of a mixture of gas and liquid including an inlet 30 for gas containing liquid droplets and an outlet 31 for substantially dry gas, including a mainly cylindrical cyclone tube 16 with at least one path of slots or perforations 19 allowing a part of the fluid, including separated liquid, to flow out of the cyclone tube 16. The demisting cyclone also includes a swirl inducing device 17, 18 to set the entering fluid in rotation. This swirl-inducing device is formed from a cascade of vanes 18 attached to a concentric core body 17, preferably cylindrical in shape, which extends towards the wall of the cyclone tube 16, the vanes 18 being in the longitudinal direction of the vanes from their leading edge 23 to their trailing edge 24.

13 Claims, 16 Drawing Sheets

AXIAL DEMISTING CYCLONE

The invention concerns separation of liquid droplets existing in a flowing gas, particularly in a situation concerning production of oil and gas. More precisely the invention concerns an axial flow demisting cyclone for separation of liquid droplets from a flowing stream of gas.

BACKGROUND

During production of oil and gas from a subterranean reservoir, the well stream will normally contain oil, gas, water and some solid particles. In order to separate the various fluids and solids, a dedicated process system for the well stream is constructed. The separation is made in several stages, where gravity forces alone, and the "fine separation" carry out the "bulk separation" of the various phases or purification is mainly utilising centrifugal forces and inertial forces together with the gravity force. A major challenge appearing in most separation stages is to remove liquid droplets from a gas stream where the liquid content in the gas is low, typically less than 1 vol % of the total volumetric flow. It is still important to immediately remove most of this liquid in order to protect downstream equipment such as compressors and additional dewatering equipment. This is done in large separators, horizontally or vertically oriented. In the following, separators dedicated to separate gas/liquid mixtures containing less than said 2 vol % liquid are denoted gas scrubbers.

In gas scrubbers, the separation takes place in several stages. First, the gas enters through an inlet nozzle, which—for vertical oriented scrubbers—may be located approximately at the middle of the scrubber in its vertical direction. At the inlet nozzle a momentum breaker plate, a vane diffuser or any similar device may be arranged in order to distribute fluids across the separator cross-sectional area. Already here, the largest drops are separated and fall down onto the liquid reservoir in the lower part of the separator.

The gas then flows upwards into a calm zone, or deposition zone, where further droplets due to gravity fall down onto the liquid surface below, alternatively first deposit on the separator wall and thereafter drain downwards on the wall.

Close to the gas outlet at the top of the separator, the gas is forced to flow through a number of parallelly mounted demisting cyclones, or some other known droplet removal equipment. The liquid that is separated by the mist eliminators is guided down to the liquid reservoir through a pipe called a drainpipe, which preferably could be submerged in the liquid reservoir. The pressure drop across the mist eliminators is an important dimensioning parameter when selecting droplet removal equipment. A large pressure drop causes an equally large suction in the drainpipe; hence the liquid level in the drainpipe is higher situated from datum than the liquid level of the reservoir. If the pressure drop is too large, liquid will be sucked up from the reservoir through the drainpipe and into the gas instead of draining down trough this.

Two main types of demisting cyclones are known. One type is characterized by a reversal of the direction of the gas in axial direction, and is here denoted as reversible flow cyclone while the other type is characterized by having the same axial direction of the flow denoted as axial flow cyclone. These two main types are further mentioned with reference to the drawings. The reversible cyclone is known to have a good ability to separate droplets from gas even at high liquid loading, but is also known to have problematically high pressure drop. The axial flow cyclone has considerably less pressure drop, but does not possess the same good ability of separating liquid droplets at high liquid loading.

Examples of known mist eliminators can be found in the patent applications PCT/NL97/00350, PCT/NL99/00677 and NL 20001016114. These are commented in more detail with reference to the drawings.

OBJECTIVES

It is an object of the present invention to provide a demisting cyclone which is suitable in connection with equipment for production of oil and gas, where the absolute pressure is relatively high, at a place in the production process where the liquid content does not exceed a few percent of the total mass flow.

It is an object of the present invention to provide a demisting cyclone as mentioned above, that induces a low pressure drop and at the same time possesses better separation efficiency than other known demisting cyclones.

These objects are achieved by the present invention.

THE INVENTION

The invention concerns an axial flow demisting cyclone for separation of a mixture of gas and liquid, comprising an inlet for a liquid containing gas and an outlet for substantially dry gas, comprising a mainly cylindrical cyclone tube which in at least one constrained area is provided with slots or perforations to allow part of the fluid including separated liquid, to flow out of the cyclone tube; comprising a swirl inducing device that induces a rotational velocity component to the entering fluid. The characterized feature is that the swirl inducing device consists of a cascade of vanes where the vanes are attached to a concentric core member that preferably is cylindrical in shape, and that extends out to the inner wall of the cyclone tube, and where the vanes are cambered from their leading edge to their trailing edge, and furthermore shaped such that when viewed in at least one 2-dimensional radial cross sectional plane perpendicular to the centre line of the cyclone tube constrained between the leading edges and the trailing edges of the vanes, then two straight lines, one from the centre axis of the cascade of vanes to the intersection of the mean line of the vanes and the outer wall of the concentric core member and another line drawn from the centre axis of the cascade of vanes to the intersection of the mean line of the vanes and the inner wall of the cyclone tube, will define an angle larger than 5 degrees.

Preferred embodiments of the invention appear from the dependent claims.

It is preferred that the liquid that is lead out of the demisting cyclone through the mentioned perforations, is lead into a closed chamber comprising a channel or a tube for draining of separated liquid.

The slots or perforations on the cyclone tube constitute preferably, but not necessarily, a substantially line shaped pattern inclined to the centre axis of the cyclone tube downstream the swirl inducing member to allow fluid, including separated liquid, to flow out of the cyclone tube.

It is practical that the said pattern of slots or perforations allowing liquid to flow out of the cyclone tube, is arranged mainly continuously, because it is difficult to assure an optimal flow of liquid out through said slots/perforations if the pattern is not continuously or mainly continuously.

It is preferred, but not a requirement, to arrange a channel or port that connects the volume outside of the slots or perforations in the cyclone tube with the centre area of the cyclone tube to allow a part of the fluid, mainly gas, to be circulated back to the cyclone tube.

The cyclone tube is in a particularly preferred embodiment extended in its axial direction downstream the first patch of slots or perforations in the cyclone tube, the extension having the same or a slightly smallerdiameter compared to the diameter of the cyclone tube upstream of said first patch of slots or perforations, and is provided with a second patch of slots or perforations to allow part of the fluid, including separated liquid that escapes passed the first patch of slots or perforations, to flow out of the cyclone tube and into another closed chamber comprising a channel or tube to drain off separated liquid.

For this embodiment it is advantageous that a port or channel connects the second closed chamber with the centre area of the cyclone tube to allow a part of the fluid flowing out trough the slots or perforations in the cyclone tube, manly gas, to be lead back to the cyclone tube.

For axial flow demisting cyclones, also the one according to the present invention, it is strongly preferred that the entering moist gas is given a rotational flow by a special member called a cascade of vanes. A preferred embodiment of the demisting cyclone according to this invention comprises a cascade of vanes with a preferably cylindrical core member that has a bore along its centre axis.

The demisting cyclone of the invention preferably has a port that connects the area outside of at least one of the patches of slots or perforations in the cyclone tube with the centre area of the cyclone tube, to allow a part of the fluid that flows out through the slots or perforations, mainly gas, to be re-injected to the cyclone tube via the bore in said core member of said cascade of vanes. The main object of injecting gas in the centre of the cyclone tube via the bore in the core member, is to prevent any creep flow of liquid following the outside of the core member of the cascade of vanes, from reaching the centre of the cyclone tube where the centrifugal forces are small, and also to improve the general flow field inside the cyclone tube. It is particularly preferred to include a swirl-inducing member at the inlet of the bore in the core member, to induce swirl to the re-circulated fluid when it re-enters the cyclone tube.

By another embodiment of the invention, a part of the entering fluid is utilized for preventing the same negative consequences of creep flow of liquid along the outside of the core member, by connecting the bore in the core member with the inlet of the cyclone. The partial flow of fluid entering the bore in the core member is thus given a rotational velocity component by the swirl-inducing member when it enters the cyclone tube.

The swirl inducing member at the inlet to the bore in the core member can consist of tangential ports that induces swirl to the re-circulated fluid or to a part of the entering fluid with a substantially tangential velocity component along the inside outermost edges of the bore. Alternatively it may consist of a secondary cascade of vanes, characterized by vanes attached to a secondary core member, preferably cylindrical in shape that extends towards the outer wall of the bore in the primary cascade of vanes.

In the following the invention is described in more detail, and also demisting cyclones according to prior art designs are described for comparison and with references to the drawings.

DRAWINGS

FIG. 1 shows schematically a prior art gas scrubber with diffuser inlet, axial flow demisting cyclones and internal drainpipe, FIG. 2 shows schematically a demisting cyclone in accordance with prior art design, with reversed flow-direction of the gas, FIG. 3 shows schematically a demisting cyclone in accordance with prior art design, with axial flow-direction of the gas, FIGS. 4a, 4b and 4c show schematically a vane section according to prior art design, where the vanes are shaped as plane semicircles, i.e. the vanes do not exhibit a camber between their leading edge and their trailing edge.

FIGS. 5a and 5b show schematically a vane section according to prior art design, where the vanes are cambered from their leading edge to their trailing edge and where, in every axial position, the vanes are perpendicular to the centre axis of the cyclone tube.

FIGS. 6a and 6b show designs of the vane section according to the present invention, FIG. 7a visualizes path lines for the liquid film on the vanes according to the present invention, while FIG. 7b shows path lines for the liquid film on the vanes of a prior art design, FIG. 8 shows schematically a demisting cyclone according to the present invention with preferred inclined slots on the cyclone tube, the slots being perpendicular to the main direction of gas flow out of the cascade of vanes, FIG. 9a shows inclined drainage slots and path lines for the liquid film in a 2 dimensional unfolded plane, while FIG. 9b shows path lines for the liquid film for drainage slots running parallel to the centre axis of the cyclone tube, FIG. 10 shows another example of inclined drainage slots according to the present invention, the slots being perpendicular to the main direction of flow out from the cascade of vanes in an overlapping pattern, FIGS. 11a, 11b and 11c show a first example of a swirl inducing inlet comprising one or more tangential ports to induce swirl to the recirculated gas before it is re-injected to the cyclone tube, or to a part of the entering gas, FIG. 12a shows a second example of a swirl-inducing inlet comprising a second cascade of vanes to induce swirl on the re-circulated gas before it is re-injected in the cyclone tube, while FIG. 12b shows a corresponding device inducing swirl to a part of the incoming fluid before it enters the cyclone tube.

Figure 1:
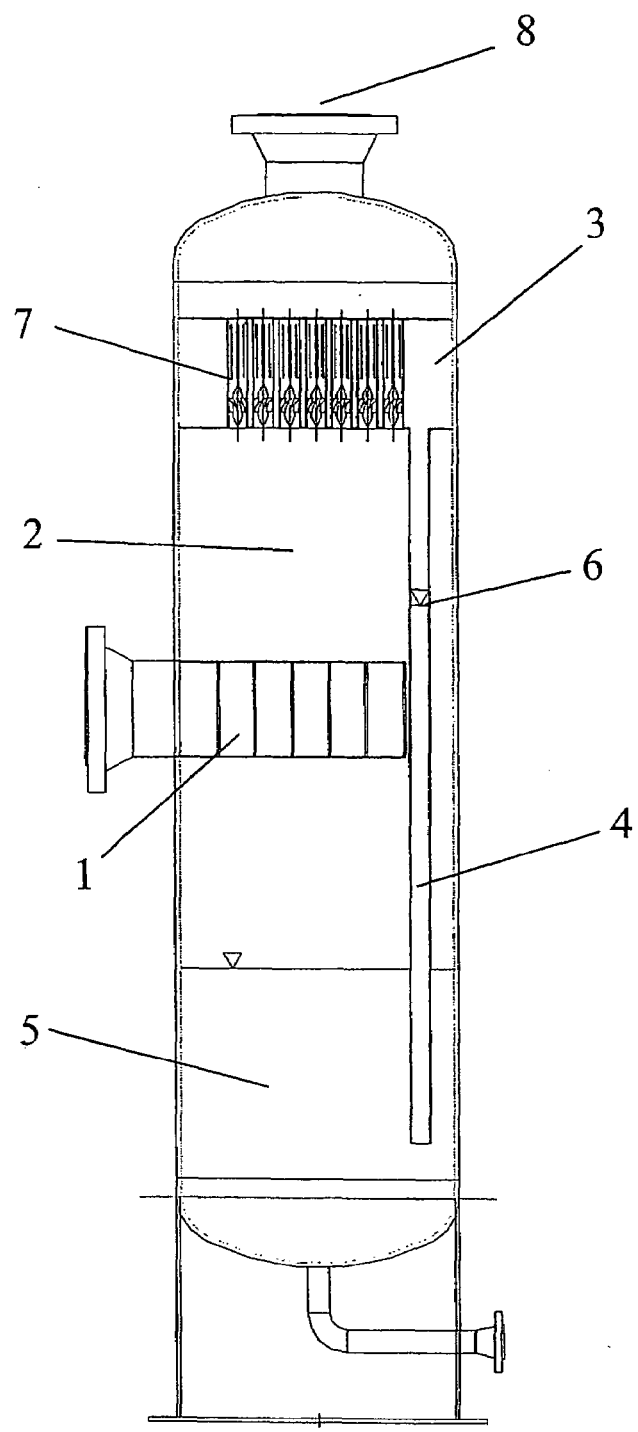

FIG. 1 shows a scrubber according to known design with a vane diffuser inlet arrangement 1 receiving and distributing the incoming gas as gentle as possible and leading the gas into the settling zone 2. The settling zone 2 is usually relatively small, hence settling of droplets due to gravitation occurs in a relatively moderate extent. It is therefore preferable that the inlet arrangement 1 is designed so that it immediately knocks out most of the liquid in the gas.

The gas flowing through the space 2 will contain many small and some medium sized droplets when the gas enters the demisting cyclones 7, where further liquid is separated off. The liquid separated in the cyclones 7 gathers in the compartment 3, and is drained through the drainpipe 4. As explained earlier, the pressure in the compartment 3 is lower than in the space 2, and it is therefore necessary to allow the lower end of the drainpipe 4 to be submerged in the liquid 5 to prevent gas from flowing upward in the drainpipe 4. By submerging the lower end of the drainpipe 4, the negative pressure in the compartment 3 compared to the space 2 is balanced by the liquid level in the drainpipe 4. The liquid level 6 will therefore be higher than the liquid level in the chamber 5, and the free available height above the liquid level 6 is an important parameter in designing and dimensioning gas scrubbers. At too large gas flow compared to the height of the scrubber, liquid will be sucked up into the chamber 3 and further out into the gas outlet. The pressure drop across the demisting equipment is therefore an important dimensioning parameter when choosing demisting equipment. Normally it is less available height in horizontal separators than in vertical separators, which makes it an even larger challenge to operate demisting cyclones optimally in horizontal separators.

Figure 2:
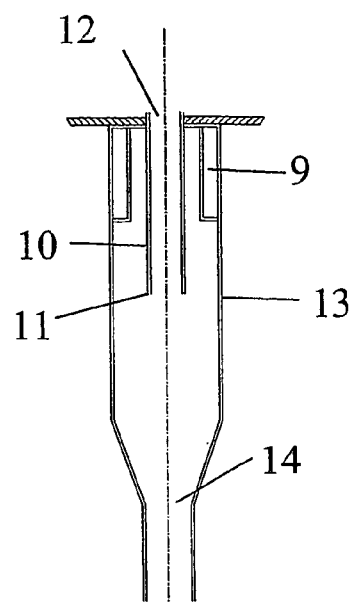

FIG. 2 shows a conventional demisting cyclone where the gas direction is reversed within the cyclone. The gas flows through tangential ports 9 close to the top of the cyclone and moves downwards while swirling until it passes the edge 11 of the pipe 10, called vortex finder, where the gas is gathered and lead upwards. The liquid and liquid droplet, the density of which is larger than the density of the gas, is thrown against the wall 13 by the centrifugal forces and drained down to the liquid outlet 14. Reversible demisting cyclones are effective regarding separation of liquid and gas, but have a significant disadvantage at high pressures; hence they are not well suited for large quantities of gas at high pressures, as the situation usually is when producing gas.

Figure 3:
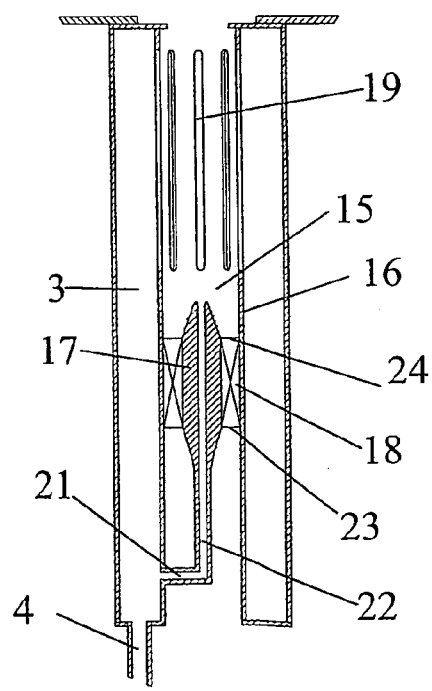

FIG. 3 shows a known demisting cyclone, denoted axial cyclone, which is described e.g. in patent applications: PCT/NL97/00350, PCT/NL99/00677 and NL20001016114.

In an axial flow cyclone, the gas has the same main flow direction, axial direction, through the entire cyclone. Axial flow cyclones have in resent times been dominating for high pressure uses because they inherit less pressure drop than reverse flowing cyclones. The axial flow cyclone comprises a cylindrical tube 16 that the gas passes through. Inside this tube a cascade of vanes is arranged, comprising an axis-symmetrical, concentric body 17 with vanes 18 that induce a rotational velocity component to the gas as it flows further on to the separation chamber 15. The concentric body 17 has a central axial bore 22. Due to the rotational velocity component in the gas and due to the denser liquid droplets compared to the density of the gas, droplets will be thrown against the wall of the cyclone tube 16. Due to the axial velocity component of the gas, the liquid film on the wall will not be able to drain adequately down by gravity, and is instead lead out of the cyclone tube wall 16 through longitudinal slots 19 in the upper part of the wall 16 and out to a drainage chamber 3 where the liquid is collected and drained through a drainpipe 4 to the liquid compartment of the separator. To augment the drainage of liquid through the slots 19, a purge flow of gas is normally set up, providing a net flow of gas in the same direction as the liquid through the slots 19 in the same direction. This is made possible by connecting the drainage chamber 3 to a low-pressure region in the centre of the cyclone tube 16 via a channel or port 21 connected to the bore in the body 17. This purge gas typically constitutes 2-10% of the total gas flow. From FIG. 3 it is understood that the purge gas constitutes a recirculation loop coming from the separation chamber 15, out to the drainage chamber 3 and back to the separation chamber 15.

Figure 4A:
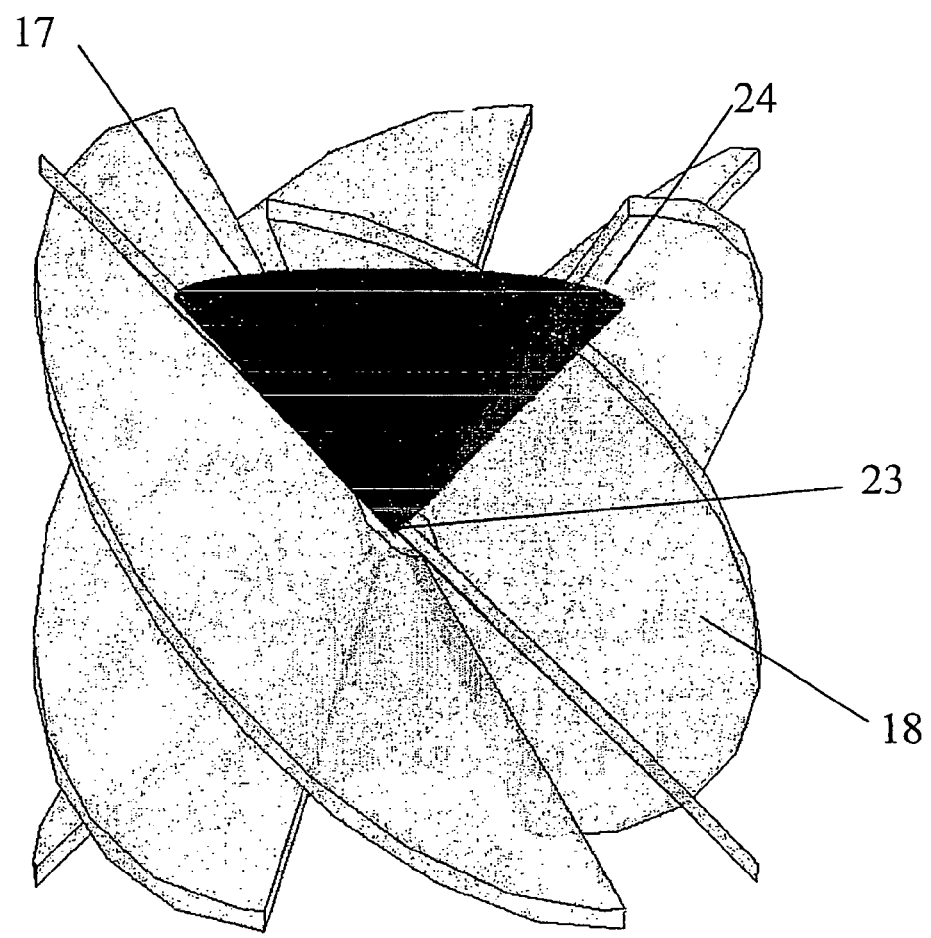
Figure 4B:
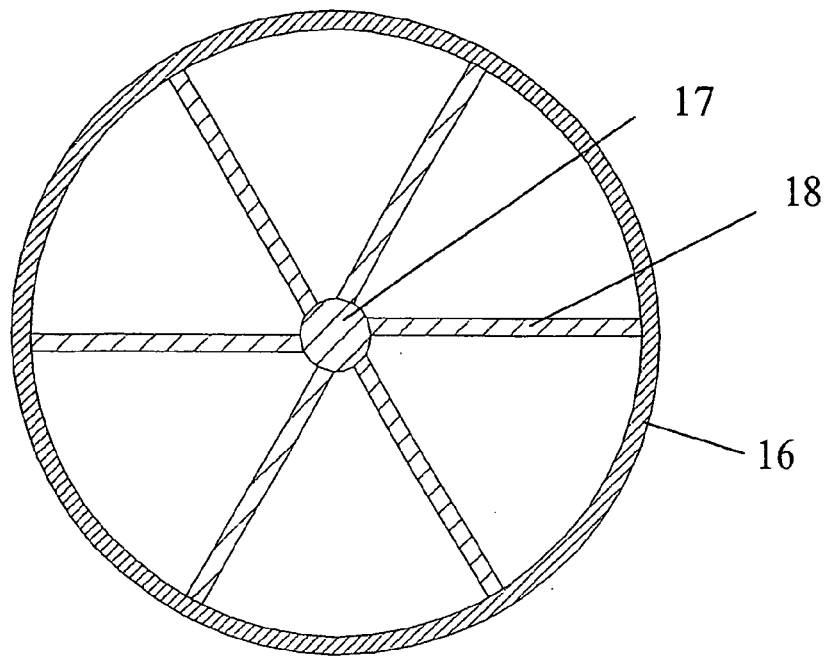
Figure 4C:
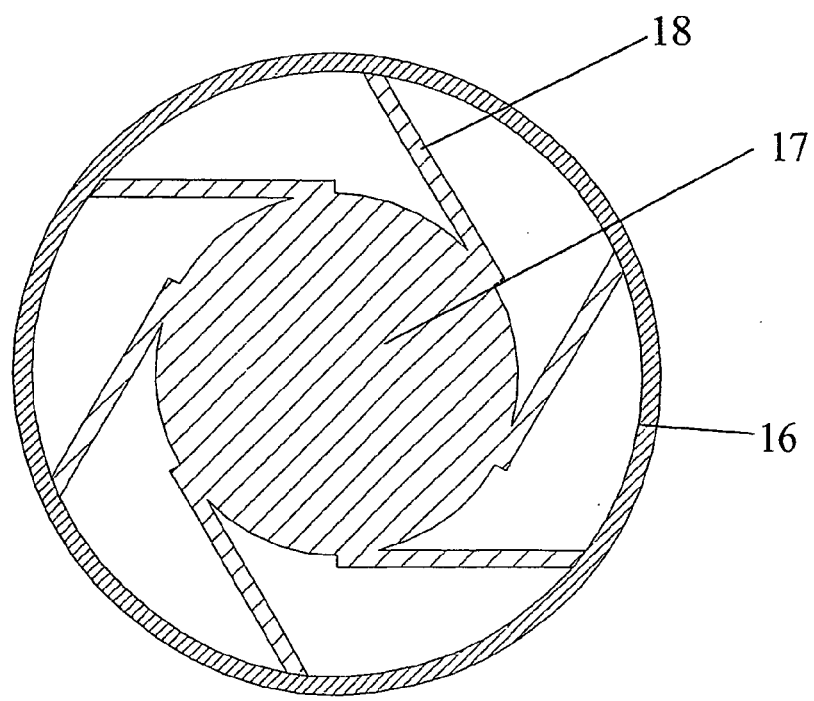

FIGS. 4a, 4b and 4c illustrate a first example of vane geometry according to known design in which FIG. 4a is a 3-D illustration of a cascade of vanes while FIG. 4b shows a radial cross section perpendicular to the longitudinal axis of the cyclone at the inlet of the cone shaped central body 17, and FIG. 4c shows a radial cross section perpendicular to the longitudinal axis of the cyclone at the outlet of the central conical body 17. An essential feature of the design of the vanes 18 is that they constitute plane plates with shapes of semicircles, i.e. the vanes 18 are not cambered anywhere in the longitudinal direction from the leading edge 23 to the trailing edge 24. This means that the incoming fluid will hit the vanes with a considerable angle of attack inducing undesirable turbulence at the backside of the vanes 18 compared to the inflow direction. Another feature of the cascade of vanes is the central conical body 17, which is connected to the vanes in less than 50% of the axial length of the vanes. This design will cause a substantial accumulation of liquid on the surface of the central body 17, which is disadvantageous because the liquid will be accumulated in the centre area of the cyclone tube 16. The large diameter of the trailing edge of the conical central body 17 will induce an unwanted wake that will suck droplets in towards the centre area of the cyclone tube.

The vane geometry as shown in FIG. 4 does in many ways represent the first generation of swirl-inducing devices applied in axial cyclones.

Figure 5A:
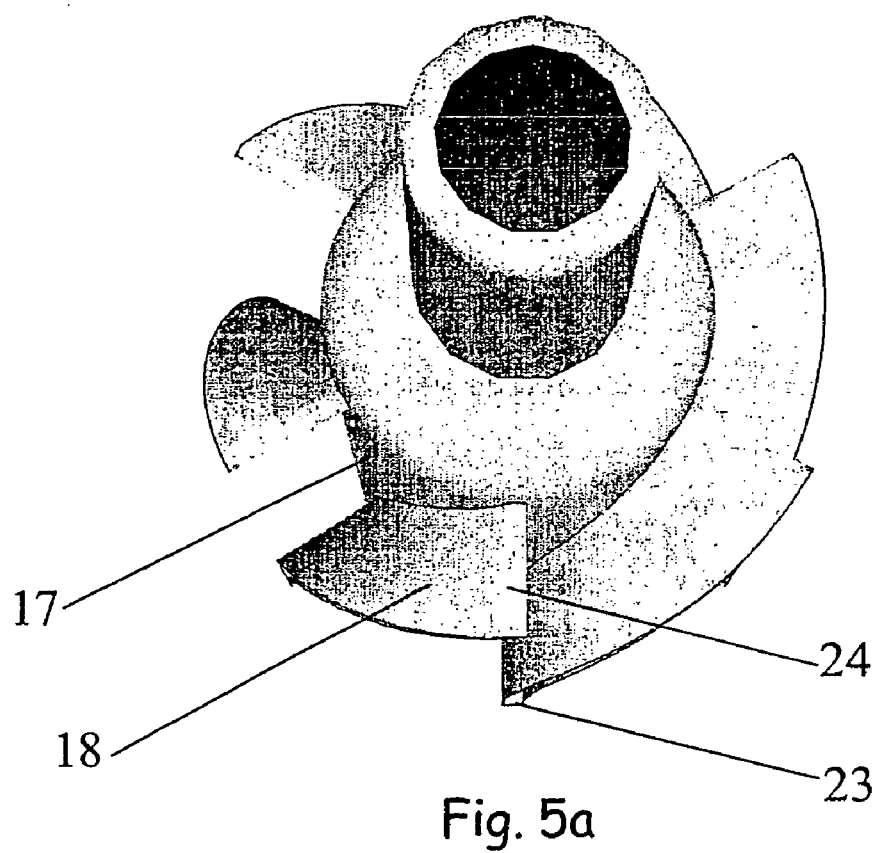
Figure 5B:
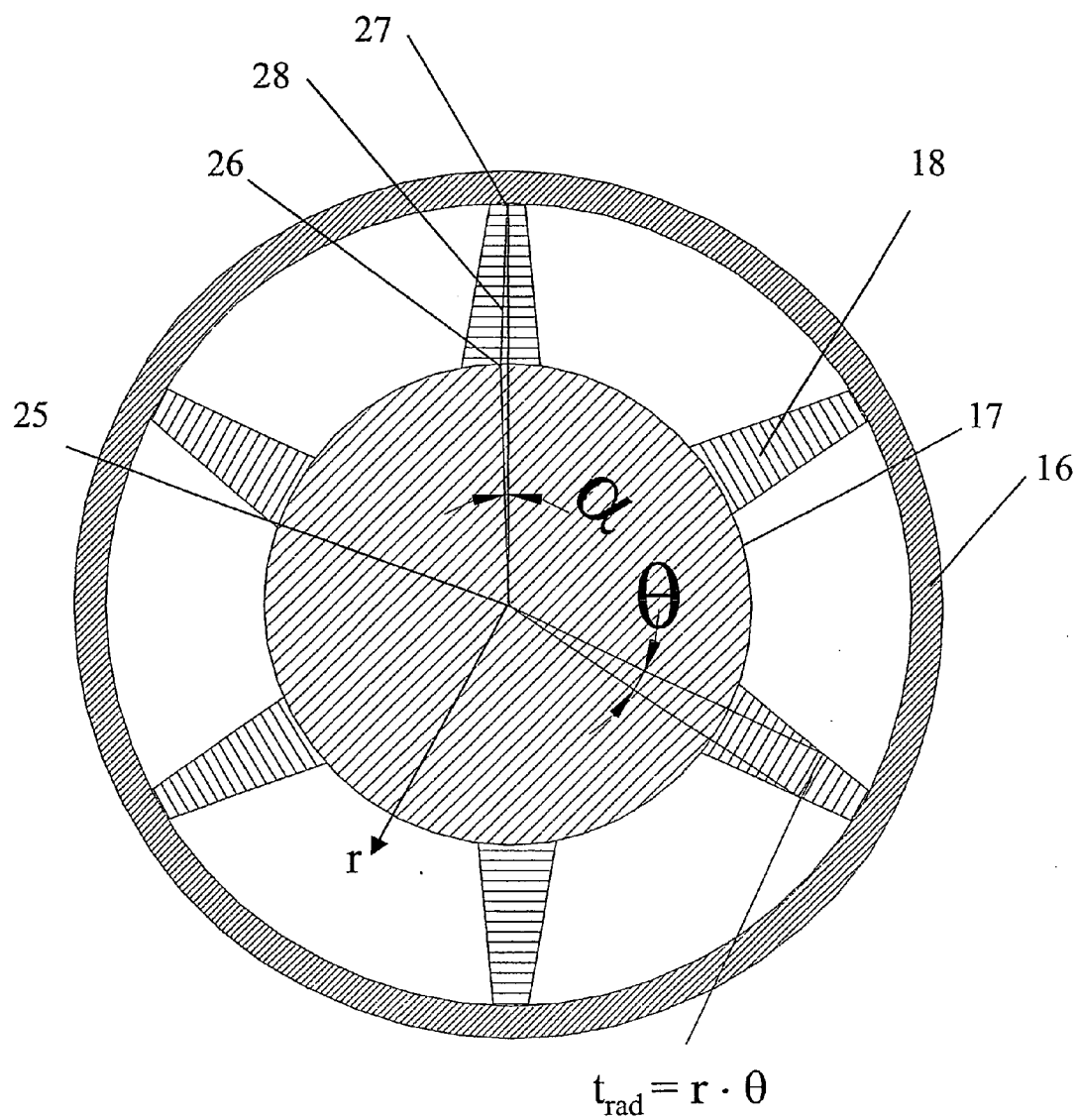

FIGS. 5a and 5b illustrate another vane geometry according to a known design where FIG. 5a is a 3-D illustration of the cascade of vanes seen from the trailing edge, while FIG. 5b shows a radial cross section perpendicular to the longitudinal axis of the cyclone on an arbitrary place within the leading edge 23 and trailing edge 24 of the vanes. Essential features separating the cascade of vanes shown in FIG. 5 from the cascade of vanes shown in FIG. 4 is the cambered vanes 18 in longitudinal direction from leading edge 23 to trailing edge 24 and the central body 17 which is cylindrical in shape and reaches throughout the entire length of the vanes 18 in longitudinal direction. Another feature of the cascade of vanes shown in FIG. 5 is that in any axial position between the leading edge 23 and the trailing edge 24 of the vanes, the vanes are perpendicular to both the central body 17 and the cyclone tube 16 as illustrated in FIGS. 5a and 5b. Another way of stating the same is: At any axial position between the leading edge 23 and the trailing edge 24 the vanes 18 are shaped such that when the vanes are viewed in a 2-D radial plane of cross section perpendicular to the longitudinal direction of the cyclone tube as shown in FIG. 5b, then two straight lines, one drawn from the centre axis of the cascade of vanes 25 to the intersection 26 of the mean line of the vanes 28 and the outer wall of the central body 17, a second drawn from the centre axis 25 of the cascade of vanes to the intersection 27 of the mean line of the vanes 28 and the inner wall of the cyclone tube 16, define an angle, a that is close to 0 degrees and less than 2 degrees. The mean line of the vane 28 is defined as the points along the vane in radial direction having a common distance to both surfaces. This is illustrated in FIG. 5b where q represents the angular displacement between the points of tangency on each surface of the vane when a straight line with length r is drawn from the centre of the central body 17 and is rotated with the centre axis 25 as centre of rotation. The thickness of the vanes projected to a radial plane of cross section can therefore be defined as (1).

(1) where t_rad the thickness of the vanes projected to a radial plane with arbitrary radius (definition)

r the radius from the centre of the central body 17 to an arbitrary point between outer wall of the central body 17 and the inner wall of the cyclone tube 16 q angular displacement between the points of tangency on each surface of the vane when a line r is drawn from the centre of the cascade of vanes 25 and is rotated with the centre axis 25 as centre of rotation The cascade of vanes as shown in FIG. 5 represents the best design and embodiment according to prior art technology.

All patent applications PCT/NL97/00350, PCT/NL99/00677 and NL 20001016114 concern ways of forcing the creep flow of liquid collected on the central body 17, out from the centre of the cyclone to increase the separation efficiency of the cyclone. According to patent application PCT/NL97/00350 a cylindrical disk is arranged on the outlet of the port leading purge gas in to the centre of the cyclone. The intention is to force the creep flow to be blown off at a larger diameter. Both the patent application PCT/NL99/00677 and patent application NL2000 1016114 involve injecting the purge gas radially outward from the longitudinal axis of the cyclone to blow off the creep flow of liquid from the centre body 17.

Figure 6A:
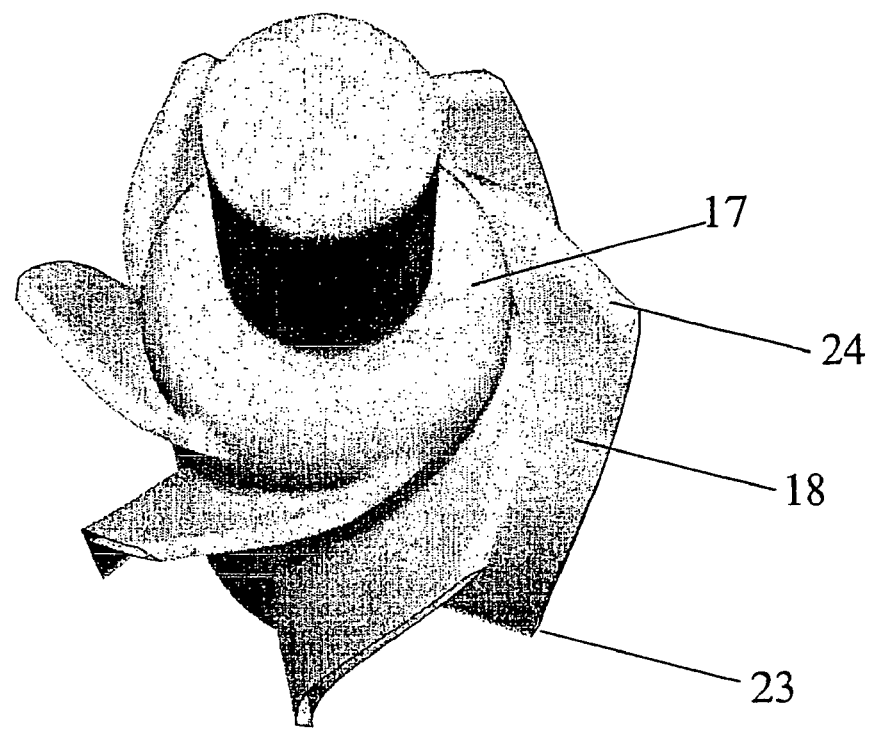
Figure 6B:
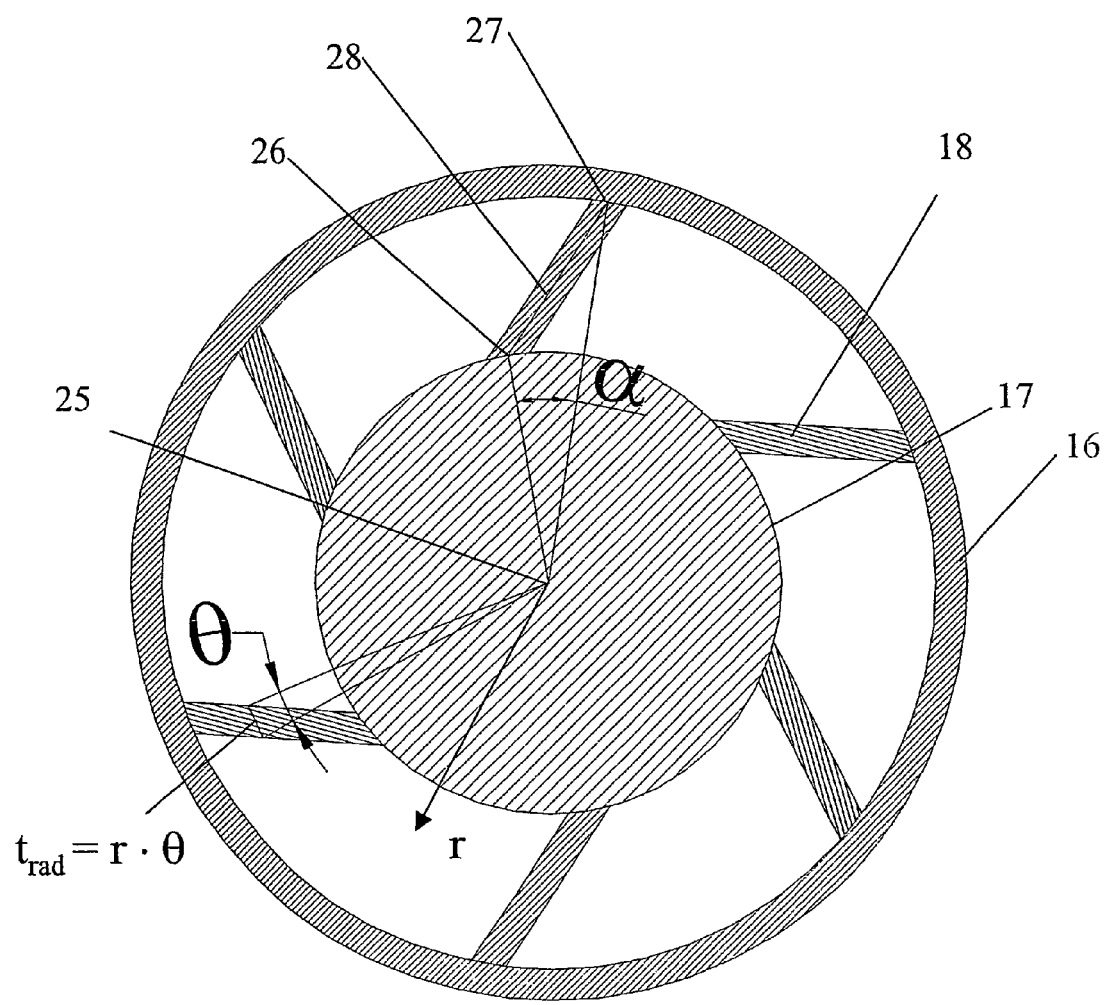

FIGS. 6a and 6b show vane geometries according to the present invention where FIG. 6a is a 3-D illustration of the cascade of vanes seen from the trailing edge of the vanes, while FIG. 6b shows a radial cross section perpendicular to the longitudinal axis of the cyclone tube 16 at an arbitrary position between the leading edge 23 and the trailing edge 24 of the vanes. In the same way as shown in FIG. 5, the vanes are cambered in axial direction from the leading edge 23 to the trailing 24, and the central body 17 is mainly cylindrical along the length of the vanes. This design differs, in the same manner as the cascade of vanes shown in FIG. 5, substantially from the cascade of vanes shown in FIG. 4.

An essential feature differentiating the cascade of vanes according to this invention from the cascade of vanes shown in FIG. 5 is seen when the vanes 18 is viewed in one or several radial planes of cross section perpendicular to the longitudinal axis of the cyclone tube between the leading edge of the vanes 23 and the trailing edge of the vanes 24, then two straight lines, one drawn from the centre axis of the cascade of vanes 25 to the intersection 26 of the mean line of the vane 28 and the outer wall of the central body 17, a second drawn from the centre axis of the cascade of vanes 25 to the intersection 27 of the mean line of the vane 28 and the inner wall of the cyclone tube 16, define an angle a that is larger than 5 degrees. In a radial cross sectional plane at the trailing edge 24 of the vane, the angle a is typically largest, typically 30-50 degrees.

The mean line of the vane 28 in a radial plane is defined as the points along the vane in radial direction having a common distance to both surfaces of the vane. This is illustrated in FIG. 6b where q represents an angular displacement between the points of tangency on each of the surfaces of the vane when a straight line with length r drawn from the centre of the central body 17 is rotated with the centre axis 25 as the centre of rotation. The thickness of the vanes projected onto a radial plane can be defined according to (1).

Provided an equal outlet angle on the mean diameter, Dm, of the vane defined according to (2), this vane geometry will give a relatively higher rotational component in towards the central body 17 compared to prior state of the art technology as shown in FIGS. 5a and 5b. Correspondingly, the rotational component will decrease towards the cyclone tube 16 compared with prior state of the art technology as shown in FIGS. 5a and 5b.

where,
Dm       Mean diameter based on area for the middle flow line through the cascade of vanes
Dcyclone       The innermost diameter of the cyclone tube 16
Dcentral-body       The outermost diameter of the central body 17

Figure 7A:
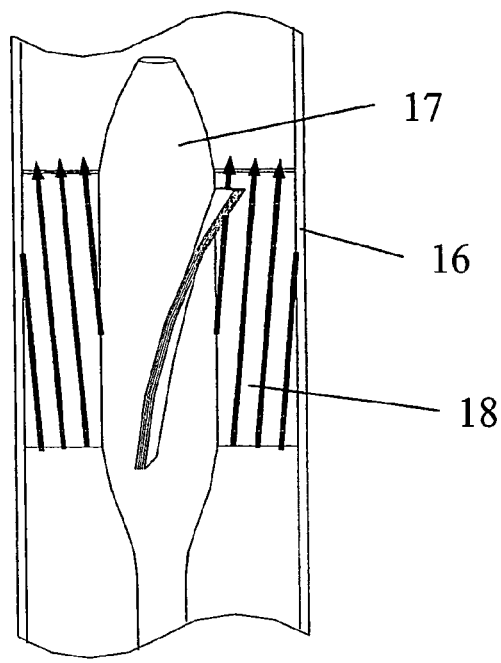
Figure 7B:
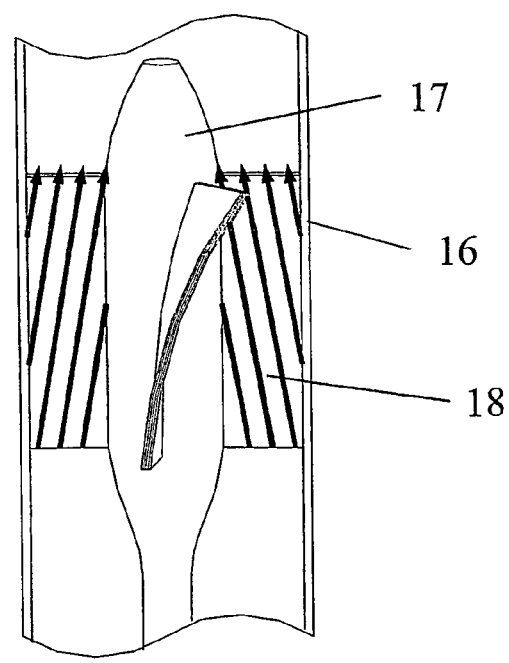

With this vane design a favourable pressure balance in radial direction is achieved that foremost will lead liquid from the central body 17 out towards the inner wall of the cyclone tube 16, thus an increased efficiency of separation is achieved. This is illustrated in FIGS. 7a and 7b, which show the path lines of the liquid film created on the vanes 18 according to this invention (7a) and prior state of the art technology (7b) respectively. FIG. 7b illustrates how the liquid film created on the vanes 18 will flow in toward the central body 17 for a vane design according to known state of the art technology, while FIG. 7a illustrates how the present invention prevents this and instead forces the liquid film to flow in the direction toward the inner wall of the cyclone tube 16.

With reference to FIG. 4c it can be seen that the radial plane of cross section perpendicular to the longitudinal direction of the cyclone at the outlet of the conical shaped central body 17 apparently is equal to the trailing edge 24 of the shape of the vanes according to this invention. As explained earlier, these two designs differ fundamentally, the main difference being the cambered shape along the longitudinal axis from leading edge to trailing edge of this invention, while the vanes shown in FIG. 4 is straight and has no camber.

Below further preferred features of the present invention is described, all of which contribute to an increase in separation efficiency.

Figure 8:
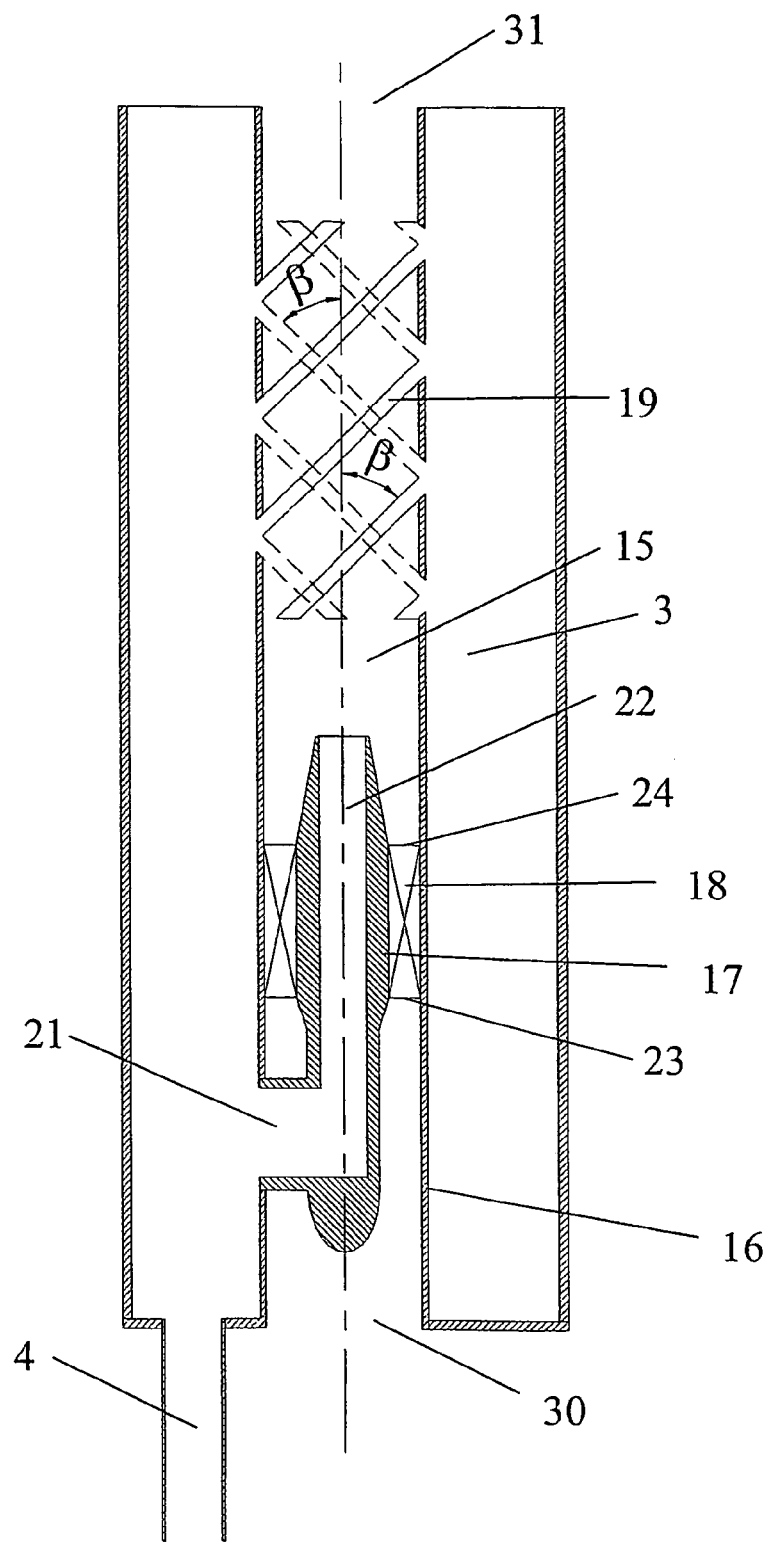

FIG. 8 shows an embodiment according to the present invention where the drainage slots 19 are inclined with such an angle that they are perpendicular to the main flow direction of the gas coming from the cascade of vanes 18. If the mean outlet angle from the vanes 18 for instance is 45 degrees, then the drainage slots shall ideally be inclined to an angle of −45 degrees from the longitudinal direction of the cyclone tube.

Figure 9A:
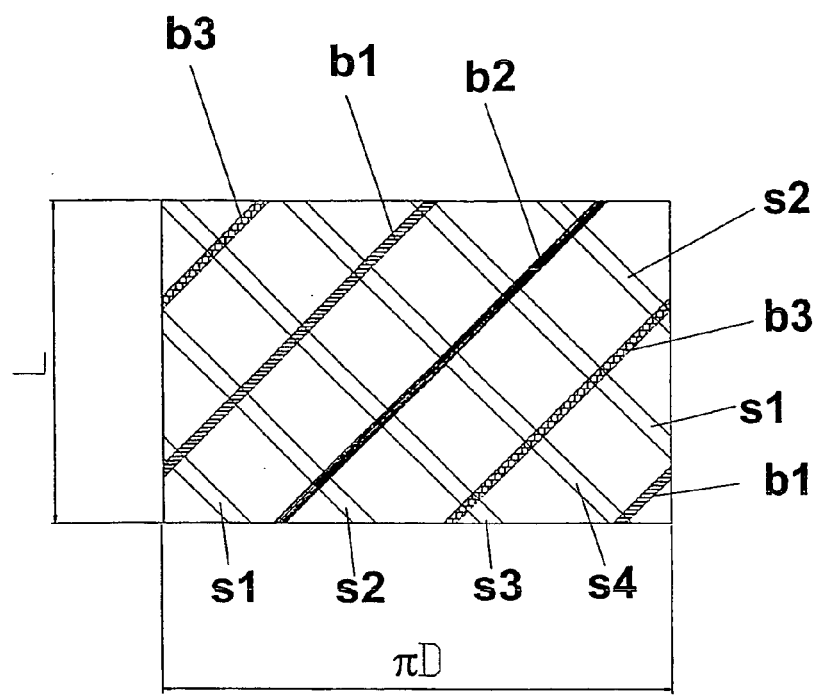
Figure 9B:
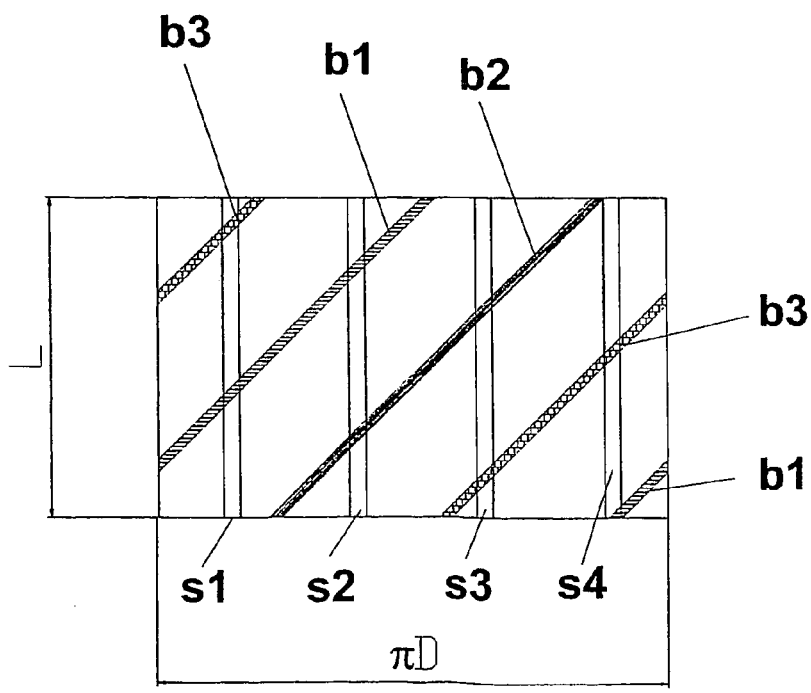

The main advantage by inclining the drainage slots 19 according to this invention is that for a given length of the perforated or slotted section of the cyclone tube, the path lines of the liquid film along the inner wall of the cyclone tube 16 will pass an inclined slot 19 more than two times the number of times for a design with slots in longitudinal direction. This is illustrated in FIGS. 9a and 9b, showing how the slots 19 in the cyclone tube 16 and the path lines of the liquid film will meet when the cylindrical slotted or perforated section is folded onto a 2 dimensional straight plane for inclined slots (9a) according to the present invention and for longitudinal slots (9b) according to prior state of the art technology respectively. For both configurations of slots, the length in the x-axis will correspond to, where D is the inner diameter of the cyclone tube 16 and the length in y-axis corresponds to the length of the slots or perforations of the cyclone tube in longitudinal direction. In both cases four slots are shown with the numbers s1, s2, s3, and s4 while three path lines for the liquid film numbered b1, b2 and b3, are shown.

As evident from the figures, each path line will pass an inclined slot 5 times, while each path line will pass a longitudinal slot in average 2.5 times. Laboratory tests have shown that the drainage capacity nearly doubles when the slots are inclined compared to longitudinal slots. A considerable increase in separation efficiency is achieved with inclined slots, particularly at high liquid loadings.

Figure 10:
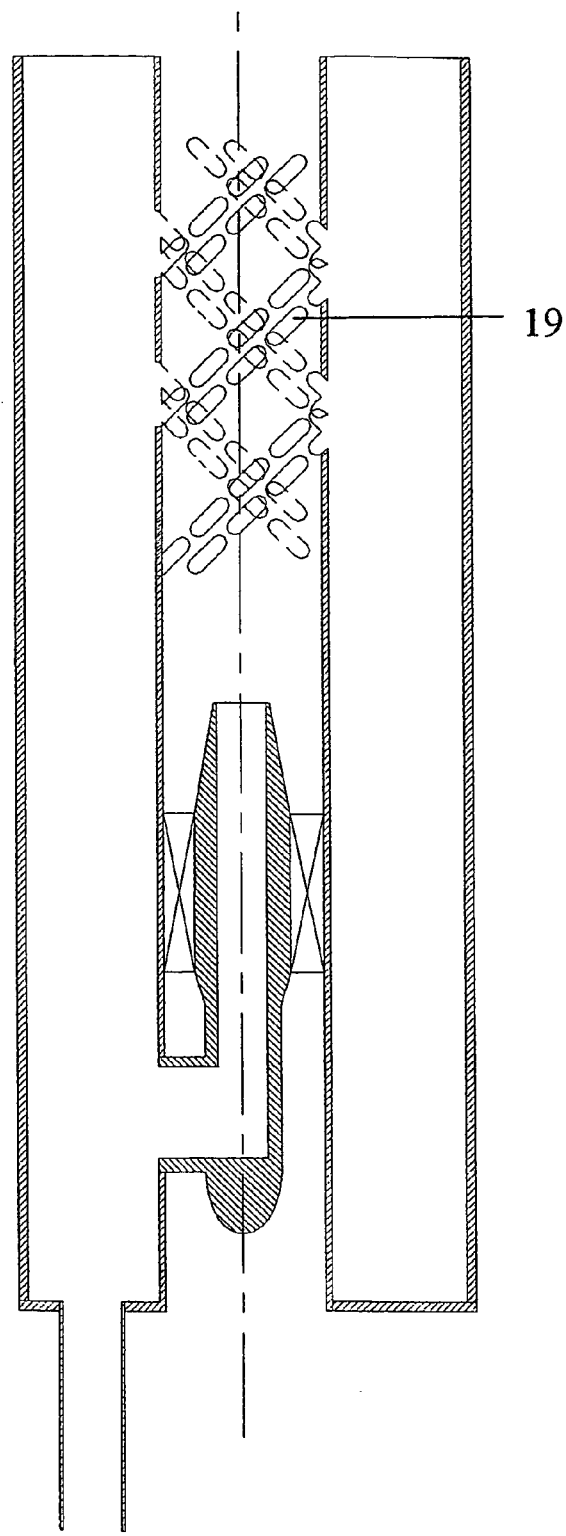

The inclined slots are preferably continuous as shown in FIGS. 8 and 9*a*, but this is no requirement. FIG. 10 shows an example of rectangular perforations 19 according to the present invention where the perforations are arranged in a mainly line shaped pattern and with a mainly continuous curvature.

The ideal, as mentioned earlier, is an inclined angle where the pattern of slots is close to perpendicular to the flow direction from the cascade of vanes. The angle of the fluid out from the cascade of vanes can however vary with varying operating conditions, which is why this feature f the invention is not an entirely unambiguous one. Every angle between 5 and 85 degrees from the longitudinal axis of the cyclone represents a detectable increase in performance compared with known demisting cyclones. An angle between 30 and 60 degrees from the longitudinal axis ensures a more significant improvement and therefore represents a more preferable inclination range for the slots or perforations.

With reference to FIG. 7 and FIG. 8, a known problem with axial cyclones is that the liquid film follows the central body 17 of the cascade of vanes and leaves the central body close to the centre of the cyclone tube 16. Because of low rotational velocity and therefore low centrifugal force close to the centre axis of the cyclone tube, any liquid collected here will be difficult to separate out to the inside wall of the cyclone tube 16. As mentioned earlier the patent applications PCT/NL97/00350, PCT/NL99/00677 and NL20001016114 concern different methods of forcing the creep flow of liquid collected on the central body of the cascade of vanes away from the centre of the cyclone tube in order to increase the separation efficiency. Patent application PCT/NL97/00350 describes a cylindrical disk arranged on the outlet of the port leading the purge gas into the centre of the cyclone tube 16. The intention is that the creep flow of liquid is to be blown off at a larger diameter. Patent applications PCT/NL99/00677 and NL20001016114 both teach an injection of purge gas radially outwards from the longitudinal direction of the cyclone to blow off the creep flow of liquid from the central body of the cascade of vanes. In accordance with a preferred embodiment of the present invention, the purge gas is given a rotational velocity component before it is lead into the centre of the cyclone tube 16, which gives the same effect. The liquid film from the central body hits this rotating gas and is carried away with a tangential velocity component and lead radially outward due to the centrifugal force. In accordance with another embodiment, a part of the incoming fluid is utilized for the same purpose, namely to prevent the negative consequences of the creep flow of liquid on the central body of the cascade of vanes, by connecting the bore in the centre of the cascade of vanes to the inlet of the axial cyclone. This partial stream of incoming fluid is lead to the bore in the centre of the cascade of vanes via the swirl inducing device so that this fluid has a rotational velocity component when entering the cyclone tube.

FIGS. 11 and 12 shows to examples according to the present invention of practical designs of swirl inducing inlets inducing the purge gas or part of the incoming fluid a rotational component before it is lead into the cyclone chamber 15. For both cases the swirl-inducing device is arranged at the inlet of the preferable cylindrical bore 22 in the central body 17.

Figure 11A:
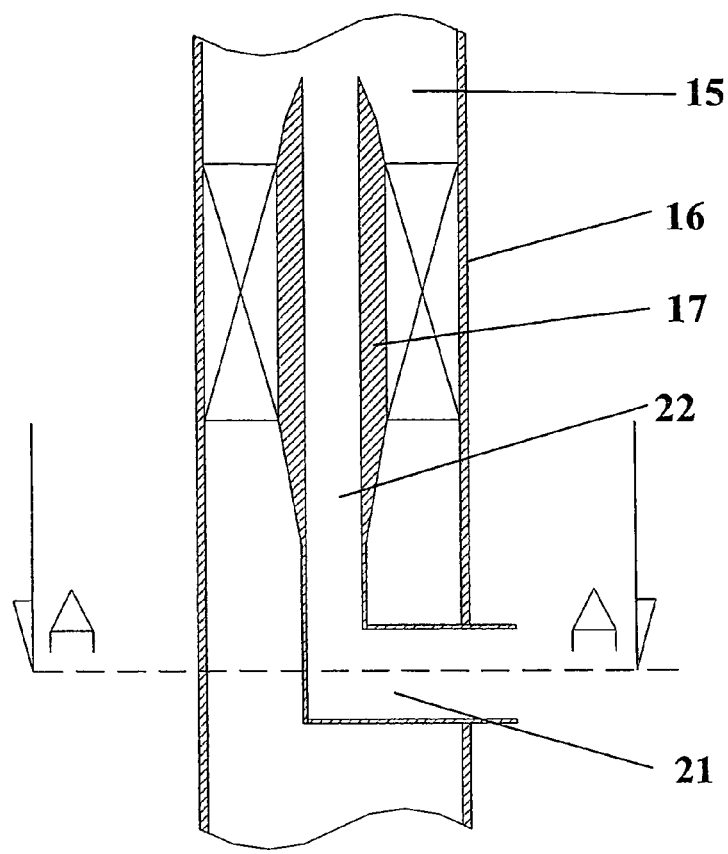
Figures 11B, 11C:
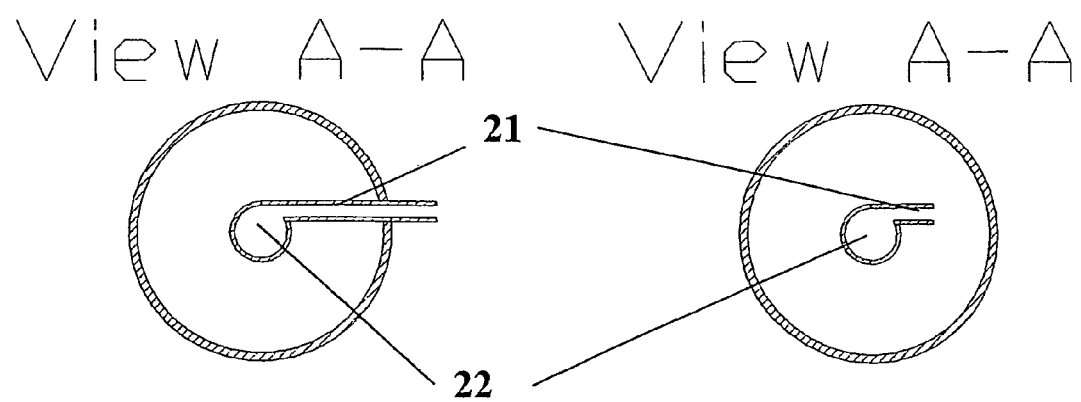

FIGS. 11*a* and 11*b*/11*c* show an axial and a radial section respectively of arrangements where the purge gas or part of the incoming fluid is injected tangentially into the cylindrical bore 22 of the central body 17 through a tangential port 21. More than one tangential port may be arranged. If re-circulated purge gas is injected into the cylindrical bore 22 in the central body 17, then the tangential port 21 communicates with the drainage chamber 3 on the outside of the drainage slots 19 on the cyclone tube 16 as shown for instance in FIG. 8. If part of the incoming fluid is lead into the cylindrical bore 22 in the central body 17, then the tangential port 21 communicates with the volume of the separator feeding the axial cyclones, i.e. the fluid entering the bore 22 in the central body 17 consists of gas containing the same amount of liquid as the feeding liquid of the cyclone. The last mentioned embodiment does not demand that the tangential port 21 penetrate the wall in the cyclone tube 16 as shown in FIGS. 11*a* and 11*b*. The inlet to the tangential port 21 can therefore be situated on an arbitrary radius between the outer wall of the bore 22 and the inner wall of the cyclone tube 16, still with a sufficient distance from the inner wall of the cyclone tube 16 to create a sufficiently open passage to the tangential port 21. This arrangement is shown in FIG. 11*c*. The tangential port 21 can furthermore be arranged upstream of the inlet of the cyclone tube 30, i.e. a part of the central body 17 of the cascade of vanes will protrude out from the cyclone tube.

Figure 12A:
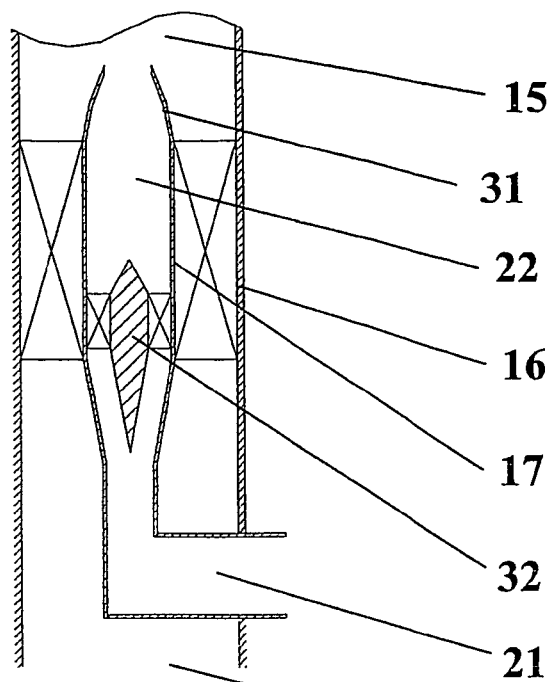
Figure 12B:
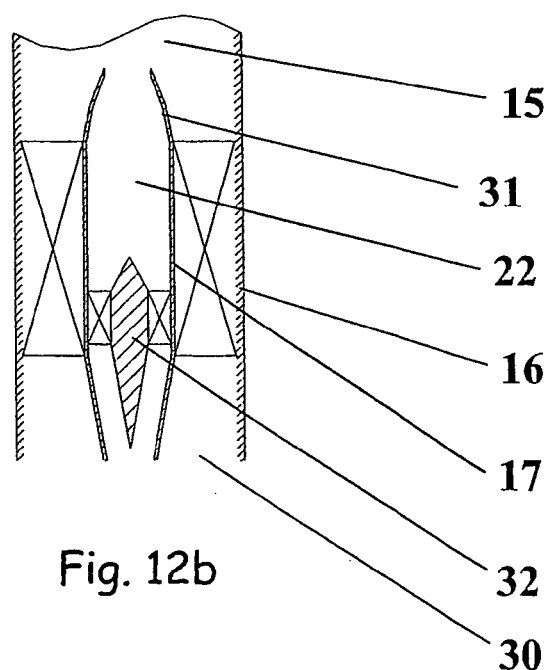

FIG. 12*a* shows an arrangement where the recirculated purge gas or a part of the incoming fluid is given a rotational velocity component with a secondary cascade of vanes 32 of suitable design. The cylindrical bore 22 in the central body 17 comprises a conical shaped section as the trailing part 31 on the downstream side of the central body 17 is constricted as shown in FIG. 12*a*. If purge gas is injected into the cylindrical bore 22 in the central body 17, then the port 21 as shown in FIG. 12*a* communicates with the drainage chamber 3 on the outside of the drainage slots 19 on the cyclone tube 16 as shown for instance in FIG. 8. The port 21 in this embodiment is preferably arranged perpendicular onto the cylindrical bore 22. In another embodiment a part of the incoming fluid is lead into the cylindrical bore 22 in the central body 17 such that the port 21 communicates with the volume in the separator 2 feeding the axial cyclones, i.e. the fluid entering the port 21 in the central body 17 consists of gas containing the same amount of liquid as the flow that feeds the axial cyclones. FIG. 12*b* shows a preferred design of the last mentioned arrangement where a part of the incoming fluid is fed into the cylindrical bore 22 in the central body 17 from the centre of the inlet 30 of the cyclone tube 16.

Another advantage of inducing swirl on the purge flow or part of the incoming fluid within the bore 22 of the central body 17, is that liquid droplets following the purge flow or the part of the incoming fluid, will be separated on the wall inside the bore 22 in the central body 17, hence the liquid will be fed into the centre of the cyclone tube 16 as a liquid film. This film will be mixed with the previously described liquid film following the outer wall of the central body 17 and be blown off in large droplets and into the rotating field of gas both on the inside and outside, and therefore be subjected to centrifugal forces leading the droplets to the wall of the cyclone tube 16.

Figure 13:
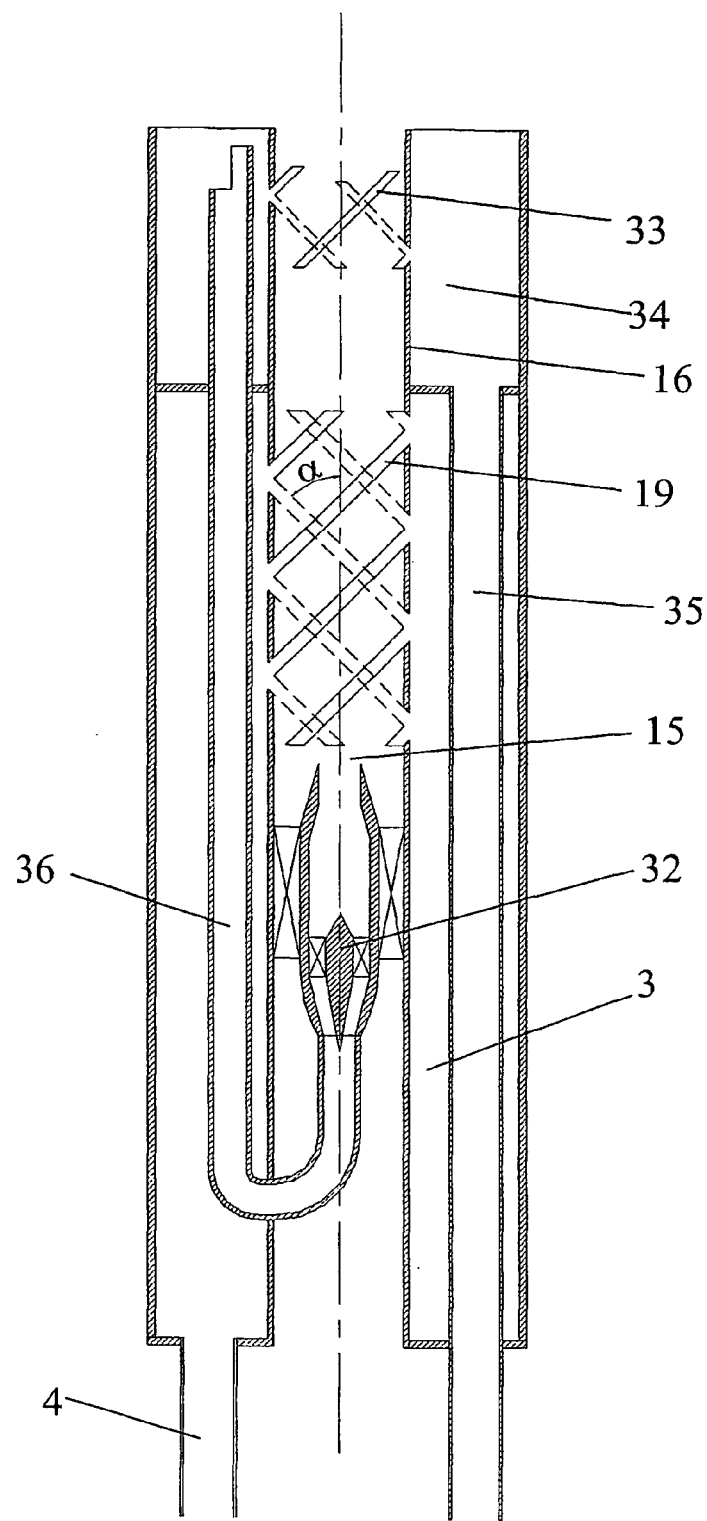
FIG. 13 shows a first example of a practical arrangement of a 2-stage axial cyclone where purge gas is taken from the second stage of separation.

FIG. 13 shows a first example of a 2 stage axial cyclone where the purge gas is taken from the second stage of separation. This arrangement is aiming to maximize the effect of the purge gas contributing to the transportation of liquid out through the drainage slots. This is obtained by extending the cyclone tube 16 in longitudinal direction downstream the first patch of perforation 19 in the cyclone tube 16, either with the same diameter or with a slightly smaller diameter, and a second patch of perforations 33 is arranged to allow part of the fluid, including separated liquid that was not drained through the first patch of perforations 19, to flow out of the cyclone tube 16 and into the second closed chamber 34 comprising a tube or a channel 35 to drain the separated liquid. The two drainage chambers 3 and 34 for the first and second patch of perforations respectively are isolated from each other and have separated drainage channels 4 and 35. It is further arranged a channel or a port 36 connecting the second closed chamber 34 with the centre area of the cyclone chamber 15 to allow part of the fluid, mainly gas, flowing out through the second patch of perforation 33 on the cyclone tube 16, to flow back to the cyclone tube 16. It is further preferred to utilize a less opening area for the second patch of perforations 33 to increase the gas velocity and thus increase the purge effect for transportation of liquid out though the perforations. This may be done because most of the liquid is drained out of the cyclone tube 16 through the first patch of perforation 19. As illustrated in FIG. 13, the opening area of the second patch of perforations 33 can be reduced by reducing the width of the slots and by reducing the length of the perforated section. Thus no purge gas is used to increase the transportation of liquid out through the first patch of perforations 19.

In FIG. 13 the illustration shows the utilization of an arrangement of vanes 32 inducing swirl on the purge gas before the gas is lead back to the centre area of the separation chamber 15. It is preferable but not necessary for a 2-stage separation arrangement to re-circulate the purge gas. As explained earlier, parts of the incoming fluid can be utilized to prevent the negative effects of creep flow of liquid following the central body of the cascade of vanes by connecting the void in the centre of the cascade of vanes to the inlet of the axial cyclone. Part of the fluid is thus lead into the void in the centre of the cascade of vanes via the swirl-inducing device inducing a rotational velocity component on the fluid before it is reloaded into the cyclone tube.

Figure 14:
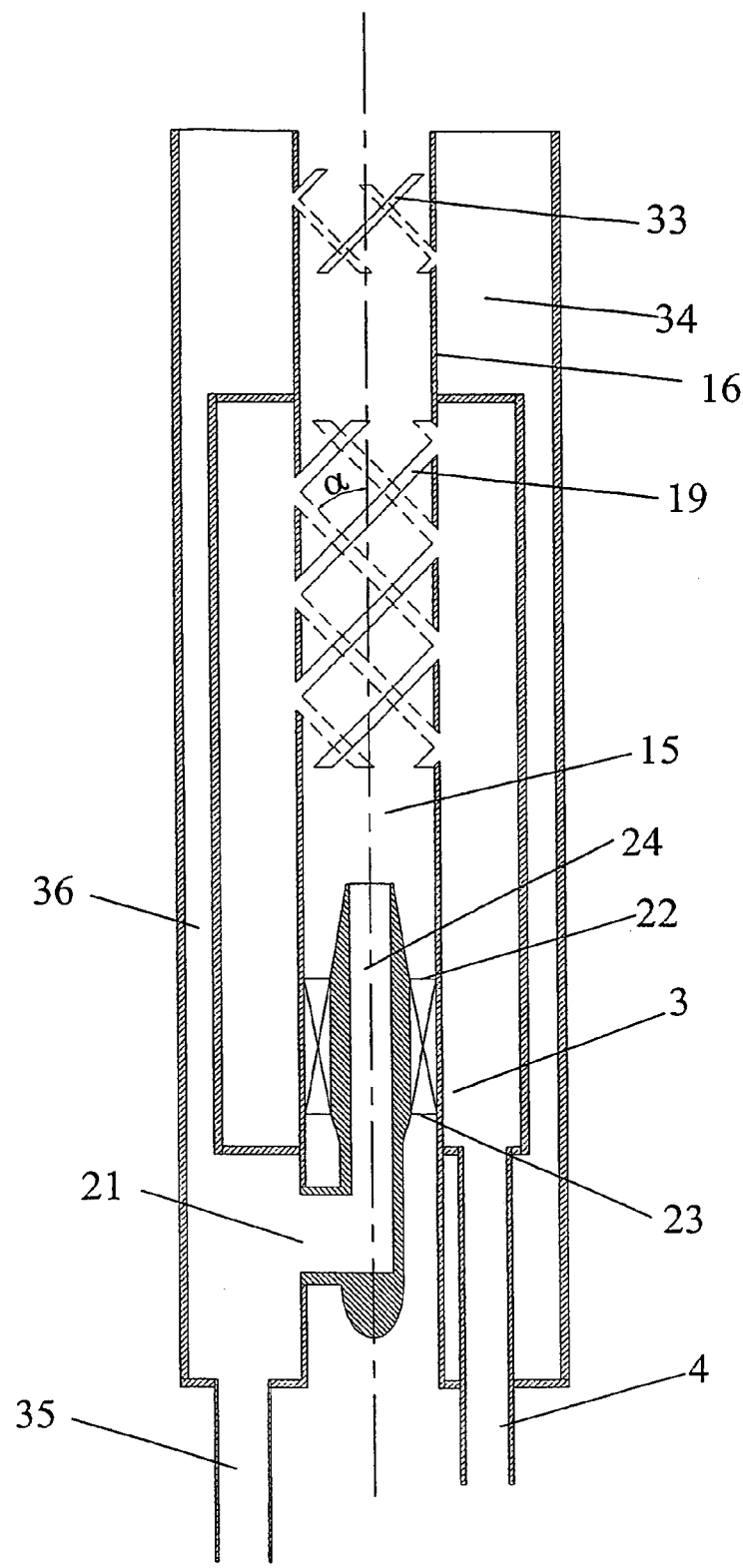
FIG. 14 shows a second example of a practical arrangement of a 2-stage axial cyclone where the purge gas is taken from the second stage of separation.

FIG. 14 shows another example of a 2-stage axial cyclone where purge gas is taken from the second stage of separation. A second patch of perforations 33 is arranged to allow part of the fluid, including separated liquid not drained through the first patch of perforations 19, to flow out of the cyclone tube 16 and into a closed chamber 34 connected to a tube or a channel 35 for drainage of separated liquid. The two drainage chambers 3 and 34 for the first and second patch of perforations respectively are isolated from each other and have separate drainage channels 4 and 35. It is furthermore arranged a channel 36 on the outside of the drainage chamber 3 for the first patch of perforations 19 connecting the second closed chamber 34 with the centre area of the cyclone chamber 15 to allow part of the fluid, mainly gas, to flow back into the cyclone tube 16. FIG. 14 illustrates an embodiment utilizing a tangential port 21 inducing a rotational velocity component on the purge gas before this purge gas is allowed to flow back to the centre area of the separation chamber 15.

The invention claimed is:

1. An axial flowing droplet catching demisting cyclone for the separation of a mixture of gas and liquid, comprising an inlet (30) for gas which contains liquid droplets, and an outlet (31) for substantially dry gas, a generally cylindrical cyclone tube (16) which includes at least one patch of slots or perforations (19) to allow part of the fluid including separated liquid to flow out of the cyclone tube (16), and a swirl inducing member (17,18) for inducing swirl on the incoming fluid;

the improvement comprising, the swirl inducing member (17,18) comprises a cascade of vanes which are attached to a generally cylindrical core body and which extend outwardly therefrom toward the inner wall of the cyclone tube (16), said vanes being cambered in the longitudinal direction from the leading edge (23) to the trailing edge (24), and said vanes having a shape that promotes a rotational velocity component that increases when moving in the radial direction from the inner wall of the cyclone tube (16) toward the outer wall of the core body.

2. An axial flowing demisting cyclone in accordance with claim 1, wherein in at least one patch inside the cyclone tube (16) there are arranged slots (19) constituting a mainly continuous line formed curvature inclined to the longitudinal axis of the cyclone tube (16) downstream of the swirl inducing device (17,18) to allow fluid, including separated liquid, to flow out of the cyclone tube (16).

3. An axial flowing demisting cyclone in accordance with claim 2, wherein said slots or perforations (19) comprise a curvature inclined from 5 to 85 degrees from the longitudinal axis of the cyclone tube (16).

4. An axial flowing demisting cyclone in accordance with claim 2, wherein said slots or perforations (19) comprise a curvature inclined from 30 to 60 degrees from the longitudinal axis of the cyclone tube (16).

5. The axial flowing demisting cyclone as defined in claim 1, wherein a port (21) connects the area (3) on the outside of the slots or perforations (19) on the cyclone tube (16) with the center area of the tube (16) to allow part of the fluid which is mainly gas to flow back to the cyclone tube (16).

6. An axial flowing demisting cyclone for the separation of a mixture of gas and liquid, comprising an inlet (30) for gas which contains liquid droplets, and an outlet (31) for substantially dry gas, a generally cylindrical cyclone tube (16) which includes at least one patch of slots or perforations (19) to allow part of the fluid including separated liquid to flow out of the cyclone tube (16), and a swirl inducing member (17,18) for inducing swirl on the incoming fluid;

the improvement comprising a second patch of slots or perforations (33) located downstream of the first patch (19) on the cyclone tube (16) to allow a part of the fluid including separated liquid not drained through the first patch of slots or perforations (19) to flow out of the cyclone tube, and into a closed chamber (34) connected to a tube or channel receiving the fluid from the cyclone tube for the drainage of the separated liquid.

7. A demisting cyclone in accordance with claim 6, wherein the cyclone tube (16) at said second patch of perforations or slots (33) has an internal diameter equal to or less than the diameter of the cyclone tube (16) at the first patch of slots or perforations (16).

8. A demisting cyclone in accordance with claim 6, wherein a void or port (36) connects the area (34) at the outside of the second patch of slots or perforations in the cyclone tube with the center area of the cyclone tube (16) allowing part of the fluid flowing out through the second patch of perforations or slots, mainly gas, to be lead back to the cyclone tube.

9. An axial flowing demisting cyclone for separation of a mixture of gas and a liquid comprising an inlet (30) for gas containing liquid droplets and an outlet (31) for substantially dry gas, comprising a mainly cylindrical cyclone tube (16) having one or more patches of slots or perforations (19,33) allowing part of the fluid including separated liguid to flow out of the cyclone tube (16), a swirl inducing member (17,18) for inducing swirl on the incoming fluid, and a void (22) provided in the center of the core body (17) of the swirl inducing member (17,18), said void (22) ends concentrically into the cyclone tube (16) and comprises a secondary swirl inducing device.

10. An axial flowing demisting cyclone in accordance with claim 9, wherein the secondary swirl inducing device situated in the void (22) of the core body (17) comprises one or more tangential ports (21) inducing fluid passing therethrough with a mainly tangential velocity component along outer edges of the void (22).

11. An axial flowing demisting cyclone in accordance with claim 9, wherein the swirl inducing device situated in the void (22) of the core body (17) comprises a secondary cascade of vanes (32) which are attached to a secondary core body that is cylindrical in shape, and extends out toward the walls of the void (22) of the core body (17).

12. An axial flowing demisting cyclone in accordance with claim 9 wherein a chamber (3,34) at the outside of at least one patch of slots or perforations (19,33) on the cyclone tube (16) is connected with the center area of the cyclone tube (16) by means of a port (21,36) and said void (22), allowing part of the fluid flowing through said slots or perforations, mainly gas, to be returned to the cyclone tube (16).

13. An axial flowing demisting cyclone in accordance with claim 9 wherein a part of the incoming fluid feeding the demisting cyclone is arranged to be directed into the cyclone tube (16) through said void (22).

* * * * *